United States Patent
Brander

[15] 3,657,567
[45] Apr. 18, 1972

[54] SIGNAL GATING CIRCUIT
[72] Inventor: Richard Brander, Cicero, Ill.
[73] Assignee: Beltone Electronics Corp.
[22] Filed: June 10, 1970
[21] Appl. No.: 44,948

[52] U.S. Cl. ........................... 307/259, 307/237, 307/256
[51] Int. Cl. ................................................. H03k 17/00
[58] Field of Search ................ 307/257, 259, 256, 237; 328/100

[56] References Cited

UNITED STATES PATENTS

| 2,888,636 | 5/1959 | McManis | 307/257 X |
| 3,159,751 | 12/1964 | Bogdan, Jr. et al. | 307/257 X |
| 3,183,373 | 5/1965 | Sakurai | 307/259 X |
| 3,207,952 | 9/1965 | Brahm | 307/259 X |
| 3,146,357 | 8/1964 | Spallone | 307/259 X |
| 2,894,130 | 7/1959 | Martin | 328/100 |

Primary Examiner—Donald D. Forrer
Assistant Examiner—B. P. Davis
Attorney—Molinare, Allegretti, Newitt & Witcoff

[57] ABSTRACT

A network for gating a signal to be transmitted across a pair of terminals is connected in parallel across the terminals. The network includes a pair of diodes connected in parallel and oppositely poled which may be biased into conduction when attenuation is desired and into nonconduction when no attenuation is desired. A feedback amplifier is employed to hold the bias voltage for one of the diodes equal and opposite to the bias voltage for the other diode. A resistor-capacitor network allows the bias voltage on the diodes to be varied gradually between the off and on conditions of the gating circuit.

13 Claims, 9 Drawing Figures

INVENTOR.
RICHARD BRANDER
BY Molinare, Allegretti,
Newitt & Witcoff
ATTORNEYS

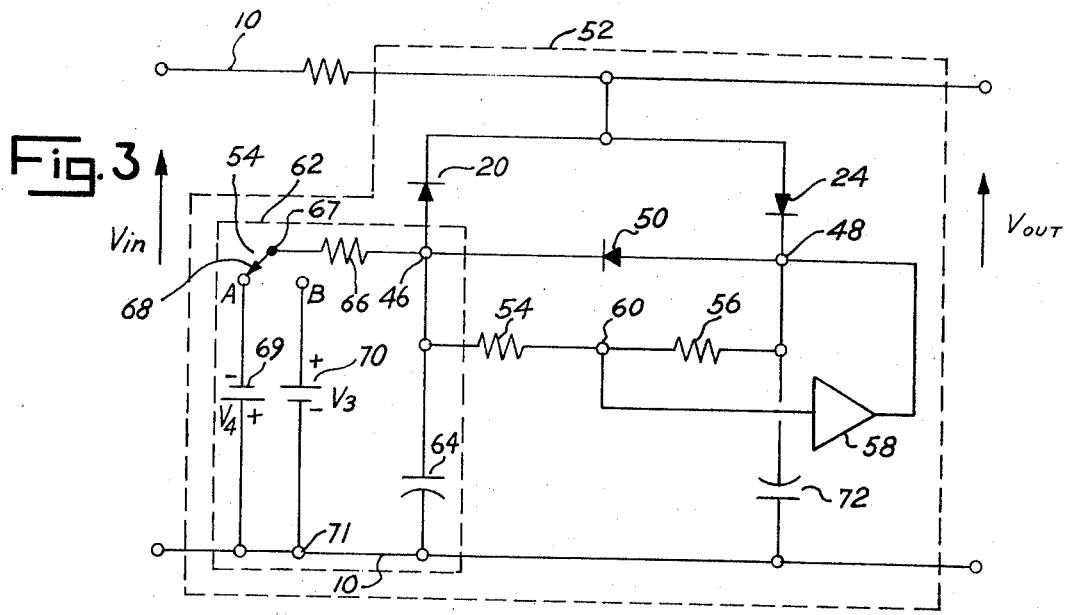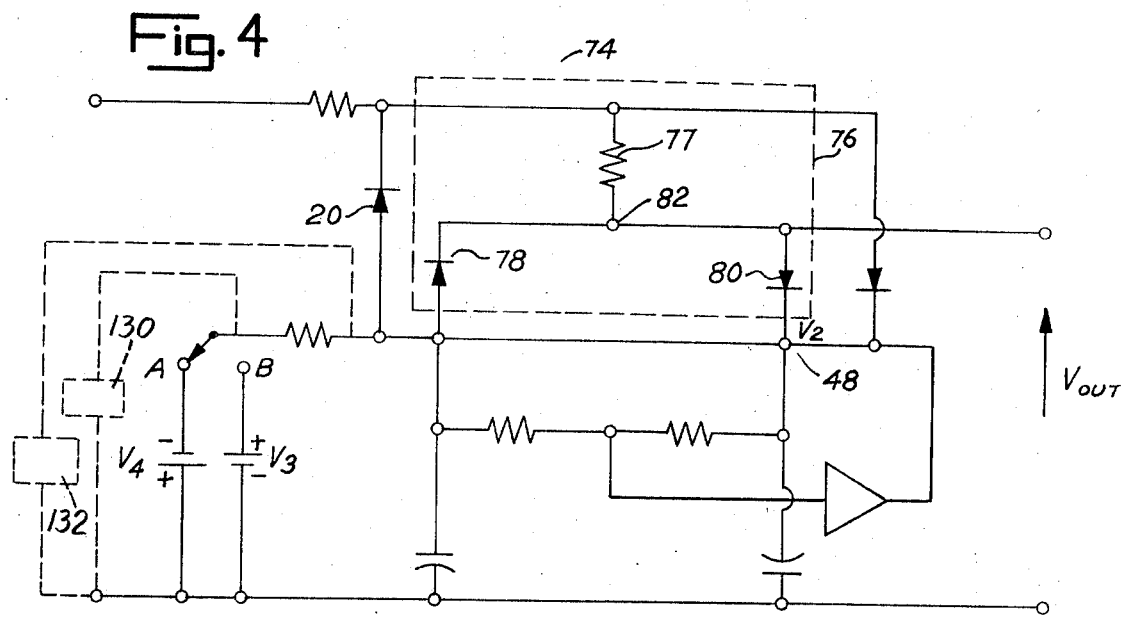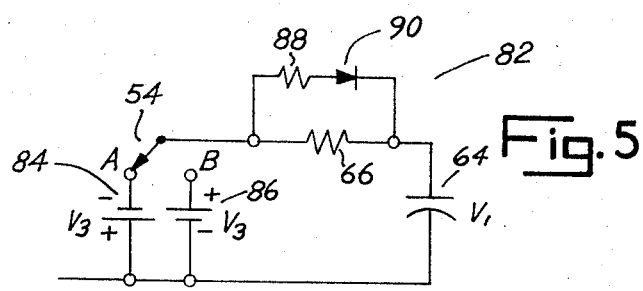

INVENTOR.
RICHARD BRANDER
BY Molinare, Allegretti,
Newitt, & Witcoff
ATTORNEYS

SIGNAL GATING CIRCUIT

BACKGROUND OF THE INVENTION

This invention relates generally to a signal gating circuit for an oscillator. One example in which such a signal gating circuit may be used is in an audiometer. The circuit may also be used in any electrical network where it is desired to gate a signal on and off.

The audiometer is a device employed for testing a person's hearing. It employs an oscillator which generates signals of varying frequency and intensity. When the audiometer is to deliver a test signal to a person, it is desirable to have a very low attenuation in the circuit so that the entire output signal of the oscillator is delivered to the person. During the intervals between the transmission of various test signals, it is desirable to have a high attenuation of the signal from the oscillator so as to eliminate the transmission of stray signals and noise to the person whose hearing is to be tested.

Accordingly, it is desirable to provide a circuit which will gate a signal on and off. However, when a signal is gated on and off by sudden changes in the attenuation of a signal gating network, transient signals may be generated. These transient signals can interfere with the output signal which the gating circuit is designed to control. It is therefore also desirable to provide such a circuit having smooth and controllable rise and decay periods between the high and low attenuation levels.

SUMMARY OF THE INVENTION

In a principal aspect, the present invention relates to a signal gating circuit which will gate a signal on and off with smooth and controllable rise and decay periods. The circuit includes a pair of diodes connected in parallel and oppositely poled in respect to each other across a pair of signal transmission terminals and means for biasing the diodes with equal and opposite biasing voltages alternately into conduction and non-conduction so that the signal may be gated on and off.

In one preferred embodiment, the invention comprises a first diode, a second diode parallel and oppositely poled in respect to the first diode, the diodes in parallel across a pair of signal transfer terminals, feedback means for maintaining the biasing voltage at the second diode equal and opposite to the biasing voltage at the first diode, and means connected to the first diode for alternately impressing a first positively poled biasing voltage and a second negatively poled biasing voltage at the first diode such that the signal may be gated on and off by the voltage impressing means.

It is accordingly an object of the present invention to provide a signal gating circuit of simple and economic construction. It is another object of the present invention to provide a signal gating circuit which will gate a signal on and off providing low attenuation in the on mode and high attenuation in the off mode.

It is a further object of the present invention to provide such a signal gating circuit which will gate a signal on and off with smooth and controllable rise and decay periods.

BRIEF DESCRIPTION OF THE DRAWINGS

There is shown in the attached drawings presently preferred alternative embodiments of the present invention, wherein like numerals refer to like elements and wherein:

FIG. 3 is a schematic diagram of a second preferred embodiment of the signal gating circuit of this invention employing a single pole double throw switch for gating the signal;

FIG. 4 is a schematic diagram of the signal gating circuit of FIG. 3 with an additional gating circuit connected in tandem with the circuit of FIG. 3;

FIG. 5 is a schematic diagram of an alternative biasing voltage control circuit for the circuit of FIG. 3;

DESCRIPTION OF THE PREFERRED EMBODIMENTS

Figure 1:
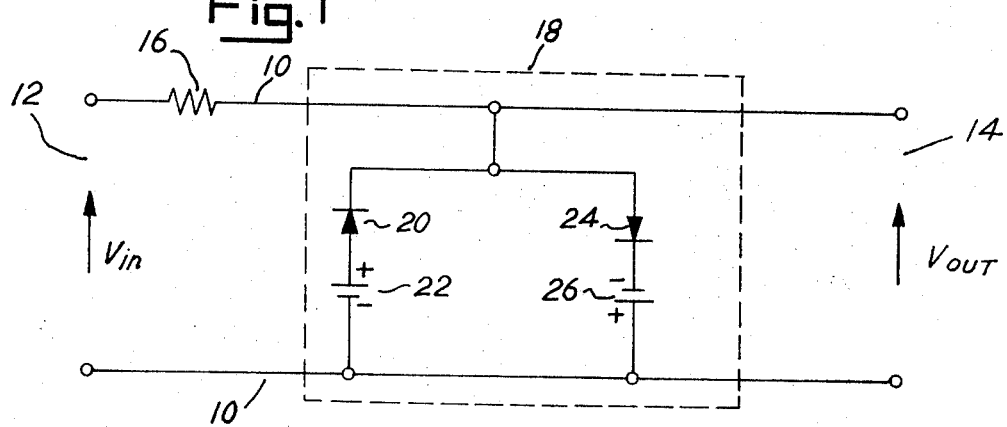
FIG. 1 is a schematic diagram of the basic signal gating circuit of the present invention.

The basic signal gating circuit employing the principals of the present invention is shown in FIG. 1. This circuit includes a pair of terminals 10 for transmitting a signal. Terminals 10 have an input port 12 and an output port 14. A resistor 16 is connected in series with one of the terminals 10 and the signal gating circuit 18 is connected in shunt across the terminals 10. The circuit includes a first shunting diode 20 in series with a DC biasing voltage source 22 and a second shunting diode 24 connected in series with a second DC biasing voltage source 26. The series connected diode 24 and source 26 are in parallel and oppositely poled in respect to series connected diode 20 and source 22. Voltage source 22 is equal in magnitude but opposite in polarity to voltage source 26.

Both diodes 20 and 24 are biased into conduction by voltage sources 22 and 26 respectively. As the magnitude of these biasing voltage sources 22 and 26 is increased, the forward current through diodes 20 and 24 is increased causing their incremental conductance to increase and thus the overall attenuation of the signal from the input port 12 to the output port 14 is increased.

The voltage current characteristics of each of the diodes 20 and 24 may be expressed by the equation $I_F = I_o (e^{aV_F} - 1)$. $I_o$ and $a$ are parameters of the diodes 20 and 24 and $V_F$ represents the forward voltage across each of the diodes 20 and 24. The alternating current conductance of these diodes in parallel connection as shown in FIG. 1 is given approximately by the equation $G_o = 2aI_o e^{aV_F}$ which is approximately equal to $2aI_F$. Thus the network produces an overall attenuation expressed in decibels as $20 \log (1 + 2aI_o R e^{aV_F})$, where $R$ is the resistance of resistor 16. It is self evident from this equation that as a bias voltage sources $V_1$ and $V_2$ are incrementally varied, a smooth and continuous change of attenuation produced by the signal gating circuit 18 is obtained.

Figure 2:
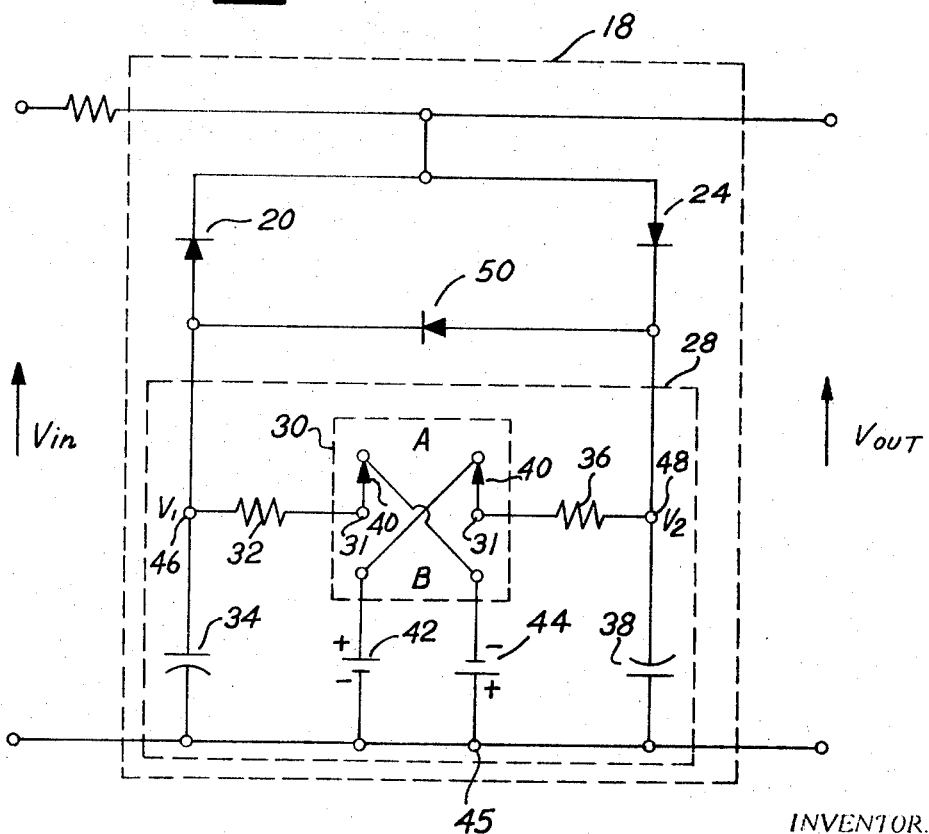
FIG. 2 is a schematic diagram of one preferred embodiment of the signal gating circuit of the present invention employing a double pole double throw switch.

The schematic diagram of FIG. 2 shows the signal gating circuit 18 with a biasing voltage control circuit 28.

This biasing voltage control circuit 28 includes a double pole double throw switch 30 having fixed contacts 31. One fixed contact 31 of the switch 30 is connected to a resistor 32. Resistor 32 is in series with a capacitor 34. The other fixed contact 31 of the switch 30 is connected to a resistor 36 equal in value to the resistor 32. Resistor 36 is in series with a capacitor 38 equal in value to the capacitor 34. The movable contacts 40 of the switch 30 are displaceable into connection with each of two equal but oppositely poled DC voltage sources 42 and 44 respectively. The voltage sources 42 and 44 share a common node 45 with the capacitors 34 and 38.

As shown in FIG. 2, with movable contacts 40 of the switch 30 in position A, the negative pole of voltage source 44 is connected through resistor 32 to the node 46 for biasing diode 20. Also, the positive terminal of voltage source 42 is connected through resistor 36 to the node 48 for biasing diode 24. In this position, current flows from voltage source 42 through resistor 36, diode 50, and resistor 32 to voltage source 44. This current produces a voltage drop across diode 50, providing small reverse bias voltages across diodes 20 and 24. Thus, with the switch 30 in position A, diodes 20 and 24 are non-conducting and a minimum of attenuation approximately equal to 0 dB is attained.

When the movable contacts 40 of the switch 30 are moved to position B, the positive terminal of source 42 is connected through resistor 32 to node 46 and the negative terminal of source 44 is connected through resistor 36 to node 48. In this position, the voltage $V_1$ across the capacitor 34 gradually increases at an initial rate approximately equal to $V_3/R_1C_1$ as current travels from the source 42 through the resistor 32, where $V_3$ is the value of source 42, $R_1$ is the value of resistor 32 and $C_1$ is the value of capacitor 34. The voltage $V_2$ across the capacitor 38 gradually decreases, discharging through the resistor 36 at an initial rate of approximately $V_4/R_2C_2$ where $V_4$ is the value of source 44, $R_2$ the value of resistor 36 and $C_2$ the value of capacitor 38.

Since $V_4 = V_3$, $R_1 = R_2$ and $C_1 = C_2$, the time rate of change of voltage at node 46 equals that at node 48. After voltages $V_1$ and $V_2$ have reached steady state no more current flows into capacitors 34 and 38. Current then flows from voltage source 42 through resistor 32, diodes 20 and 24, and resistor 36 to voltage source 44, causing the diodes 20 and 24 to be forward biased. The attenuation is thereby increased from a value of approximately 0 dB with the switch 30 in position A to an attenuation which can easily be made greater than 60 dB, with switch 30 in position B.

The signal gating circuit 18 shown in FIG. 2 requires a double pole double throw switch 30, equal resistors 32 and 36 and equal capacitors 34 and 38. The circuit provides a means for gating a signal on and off with smooth and controllable rise and decay periods having a low attenuation in the "on" mode and a high attenuation in the "off" mode. The time rate for the rise and decay periods, given by $V/RC$, can be changed by varying the value of the voltage sources 42 and 44, the resistors 32 and 36 or the capacitors 34 and 38. It is preferable to vary this rate by varying the values of the capacitors 34 and 38.

ALTERNATIVE PREFERRED EMBODIMENTS

The network of FIG. 3 shows an alternative signal gating circuit 52 requiring merely a single pole double throw switch 54 in which no matching of resistors or capacitors is required and in which only one element need be changed to vary the rise and decay periods between the "on" and "off" modes.

This circuit 52 employs shunting diodes 20 and 24 connected across the terminals 10 and a limiting diode 50 connected between the two diodes 20 and 24. A pair of series connected equal feedback resistors 54 and 56 are connected in parallel with the limiting diode 50. A high gain amplifier 58 is connected between the node 60 shared by the resistors 54 and 56 and the node 48 at the cathode of diode 24. The feedback amplifier 58 is employed to provide a voltage $V_2$ at node 48 which will produce a null voltage at node 60. Because the resistors 54 and 56 are equal in value, a null voltage at node 60 occurs when voltage $V_2$ is equal and opposite to voltage $V_1$ at node 46. Thus by controlling the voltage $V_1$ at node 46, the voltage $V_2$ at node 48 is also controlled and maintained at a value equal and opposite to voltage $V_1$.

A biasing voltage control circuit 62 is employed in the signal gating circuit 52 to control the voltage $V_1$ and thus the voltage $V_2$. Circuit 62 includes a capacitor 64 connected between node 46 and lower terminal 10 and a resistor 66 connected between node 46 and the fixed contact 67 of single pole double throw switch 54. The movable contact 68 of switch 54 is displaceable into connection with a negatively poled DC voltage source 69 in position A and with a positively poled DC voltage source 70 in position B. Sources 69 and 70 share a common node 71 with the capacitor 64 on the lower terminal 10.

A by-pass capacitor 72 is connected between node 48 and the lower terminal 10 for the purpose of shunting out AC signals from voltage $V_2$. Accordingly, its value is not critical.

The operation of circuit 52 is as follows. With switch 54 in position A, current flows to voltage source 69 through resistor 66 and diode 50 from node 48. This current produces a voltage drop across diode 50, providing reverse bias voltages across diodes 20 and 24. Since the voltage $V_2$ at node 48 is maintained equal and opposite to voltage $V_1$ at node 46, the reverse bias of diode 24 equals the reverse bias of diode 20, and both are in the nonconducting mode. Thus, with switch 54 in position A, a very low attenuation is achieved and the signal is gated into the "on" mode.

When switch 54 is moved into contact with source 70 in position B, the voltage $V_1$ across the capacitor 64 increases at an initial time rate of change approximately equal to $V_3/R_1C_1$ where $R_1$ is the value of resistor 66 and $C_1$ is the value of capacitor 64. During this time the voltage $V_2$ at node 48 will decrease at an initial time rate of change approximately equal to $V_3/R_1C_1$. When voltages $V_1$ and $V_2$ have reached the steady state, no more current flows in capacitor 64. Current then flows from voltage source 70 through resistor 66 and diodes 20 and 24 to node 48. Since voltage $V_2$ at node 48 is maintained equal and opposite to voltage $V_1$ at node 46, diodes 20 and 24 are equally forward biased. Thus, with the switch 54 in position B, the diodes 20 and 24 are conducting and provide a high attenuation for the network. In this position, the signal gating circuit 52 gates the signal across the terminals 10 into the "off" mode.

When switch 54 is moved back into position A in contact with source 69, the voltage $V_1$ across the capacitor 64 decreases at an initial time rate of change approximately equal to $V_4/R_1C_1$. Likewise, the voltage $V_2$ at node 48 increases at an initial time rate of change also given by $V_4/R_1C_1$. When the voltages $V_1$ and $V_2$ have reached the steady state, the diodes 20 and 24 are again placed in the nonconducting mode and thus this signal gating network 52 again gates the signal across terminals 10 into the "off" mode.

As previously explained, the time rate of change in achieving maximum attenuation to gate a signal into the "off" mode is given by the equation $V_4/R_1C_1$. The time rate of change required in achieving minimum attenuation for gating the signal on is given by the equation $V_3/R_1C_1$. Accordingly, the voltage sources 69 and 70 with voltages $V_4$ and $V_3$ respectively need not be equal in absolute value in respect to each other. In fact, their values may be easily and independently varied to obtain different rise and decay periods. Other advantages of the signal gating circuit 52 over the signal gating circuit 18 are that only a single pole double throw switch 54 is required. Also, only a single capacitor 64 or single resistor 66 need be changed to vary the overall rise and decay periods of the signal gating network 52 whereas two matched capacitors 34 and 38 or two matched resistors 32 and 36 had to be changed to vary the overall rise and decay periods for the signal gating network 18. Furthermore, neither the capacitor 64 nor the resistor 66 need be matched to another element in the signal gating circuit 52 to obtain the desired results of this invention.

The signal gating circuit 74 shown in FIG. 4 is identical to the circuit 52 shown in FIG. 3 with the exception of an additional diode gating circuit 76 connected in tandem with the signal gating circuit 52 of FIG. 3. In the signal gating circuit 74, a resistor 77 in series connection with a tandem shunting diode 78 is connected in parallel across shunting diode 20. An additional tandem shunting diode 80 is connected between the node 82 shared by resistor 77 and diode 78 and the node 48. The additional shunting diodes 78 and 80 function to increase the maximum attenuation of the signal gating network 74.

FIG. 5 shows alternative biasing voltage control circuit 82 which will provide unequal rise and decay periods between the "on" and "off" modes and eliminate the requirement of unequal values of voltage sources 69 and 70. In the control circuit 82, switch 54 is connectable to either of two oppositely poled equal valued voltage sources 84 and 86. A resistor 88 in series with a diode 90 are placed in parallel with resistor 66. With this circuit 82, the rate of decrease of bias voltage $V_1$ during the rise period is given by the equation $V_3/R_1C_1$ where $R_1$ is the value of resistor 66 and $C_1$ is the value of capacitor 64. The rate of increase of bias voltage $V_1$ during the signal decay period is given by the equation $$V_3 \bigg/ \left[\left(\frac{R_1 R_2}{R_1 + R_2}\right) C_1\right]$$

where $R_2$ is the value of resistor 88.

Figure 6:
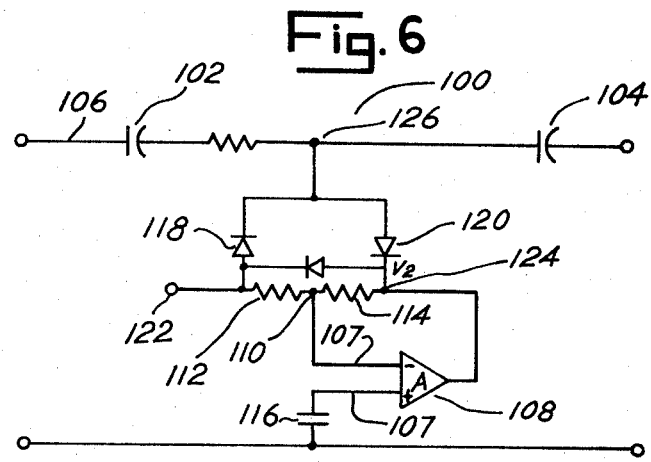
FIG. 6 is a schematic diagram of another alternative embodiment of the circuit of the invention.

Another alternative embodiment of the present invention is the schematic diagram of circuit 100 shown in FIG. 6. This circuit 100 differs from the circuit shown in FIG. 3 as follows.

Capacitors 102 and 104 are connected in series with the upper terminal 106 of the circuit 100, with the capacitor 102 at the input and capacitor 104 at the output of circuit 100. Also, one terminal 107 of the amplifier 108 is connected to the node 110 between equal series connected resistors 112 and 114. The other terminal 107 of the amplifier 108 is connected to a DC offset voltage source 116.

Figure 7:
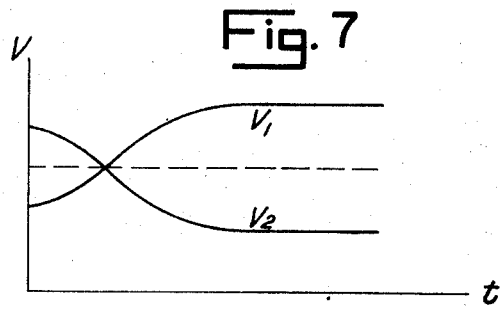
FIG. 7 is a graph of the bias voltages of FIG. 6.

With this circuit shown in FIG. 6, the control voltage system is shifted in level and it is no longer necessary to have the biased voltages for the diodes 118 and 120 be equal and opposite. The only requirement is that the bias voltages $V_1$ and $V_2$ at nodes 122 and 124 respectively maintain a constant average value. Since the capacitors 102 and 104 block any DC current, the DC voltage at the junction 126 of the diodes 118 and 120 remains at a constant average value of the bias voltages $V_1$ and $V_2$. A graph of these voltages against time is shown in FIG. 7. It may be readily seen that the average of these two voltages at any given time remains a constant. The bias voltages across the diodes and the gating characteristics of the circuit 100 are the same as for the circuit shown in FIG. 1.

Figure 8:
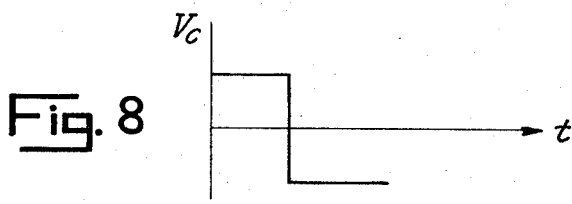
FIG. 8 is a graph of the voltage characteristics of the bistable voltage source shown in FIG. 4.
Figure 9:
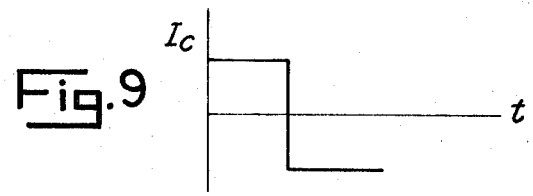
FIG. 9 is a graph of the bistable current source shown in FIG. 4.

Another variation to the circuits 52 and 74 shown in FIGS. 3 and 4 respectively, is the replacement of the single pole double throw switch 54 and voltage sources 69 and 70 with a bistable voltage source, 130 connected to the resistor 66. A graph of the output of the bistable voltage source is shown in FIG. 8. Similarly, a bistable current source 132, having an output current shown in FIG. 9, may be applied to node 46 to replace the switch 54, voltages sources 69 and 70 and the resistor 66.

It is to be understood that the present embodiments of this invention described above are merely illustrative of some applications of the principals of this invention. A variety of other arrangements well-known in the art could be similarly employed to instrument this invention without departing from the true spirit of the scope thereof.

What is claimed is:

1. A network for gating a signal across a pair of signal transmission terminals comprising, in combination:
   a first diode;
   a second diode in parallel and oppositely poled in respect to said first diode, said diodes in parallel across said terminals; and
   means connected to said diodes for biasing said diodes alternately into conduction and nonconduction said biasing means including a bistable voltage source and a resistor-capacitor circuit connected between said bistable voltage source and said diodes such that abrupt changes in voltage from said bistable voltage source to alternately gate said signal on and off produce gradually varying changes in the biasing voltages for said diodes.

2. The network as set forth in claim 1 including a limiting diode connected between the anode of said first diode and the cathode of said second diode.

3. The network as set forth in claim 2 including means for gradually varying the bias on said diodes in response to abrupt changes in voltage at said fixed contacts.

4. A network for gating a signal across a pair of terminals comprising, in combination:
   a first diode;
   a second diode parallel and oppositely poled in respect to said first diode, said diodes in parallel across said terminals;
   feedback means for producing changes in voltage on the cathode of said second diode equal and opposite to the changes in voltage on the anode of said first diode; and
   biasing means connected to the anode of said first diode for alternately impressing a first DC voltage and a second DC voltage at the anode of said first diode such that said signal may be gated alternately on and off by said voltage impressing means.

5. The network as set forth in claim 4 wherein said feedback means comprise a pair of equal resistors in series connection between the anode of said first diode and cathode of said second diode and a feedback amplifier connected between the node common to said series connected equal resistors and the cathode of said second diode.

6. The network as set forth in claim 4 wherein said biasing means comprise a single pole double throw switch having a fixed contact connected to the anode of said first diode and a movable contact displaceable into connection with a first DC voltage source and a second DC voltage source.

7. The network as set forth in claim 4 including a limiting diode connected between the anode of said first diode and the cathode of said second diode for limiting the voltage at said anode and said cathode.

8. The network as set forth in claim 4 including a pair of tandem diodes and a tandem resistor, one of said tandem diodes in series connection with said tandem resistor, said series connection in parallel with said first diode and the other tandem diode in series connection between the node common to said one tandem diode and said tandem resistor and the node at the cathode of said second diode.

9. The network as set forth in claim 4 wherein said biasing means include means for gradually varying said impressing voltage between said first DC voltage and said second DC voltage.

10. The network as set forth in claim 4 wherein said biasing means comprise a switch having a fixed contact and a movable contact, said movable contact displaceable into connection with a first DC voltage source and a second DC voltage source, said sources connected to a common node, a voltage control resistor connected between said fixed contact of said switch and the anode of said first diode, and a voltage control capacitor, connected between the anode of said first diode and the node common to said sources such that said signal may be smoothly gated on and off in response to abrupt changes in voltage at said fixed contact.

11. A network for gating a signal across a pair of terminals comprising, in combination:
   a first diode and a second diode parallel and oppositely poled in respect to said first diode, said diodes connected at a junction to one of said terminals;
   a first capacitor connected in series with said one terminal at the input of said network and a second capacitor connected in series with said one terminal at the output of said network such that no DC current flows from said junction through either of said capacitors;
   feedback means for producing changes in voltage on the cathode of said second diode equal and opposite to the changes in voltage on the anode of said first diode; and
   biasing means connected to the anode of said first diode for impressing a first DC voltage and a second DC voltage at the anode of said first diode such that the signal may be gated alternately on and off by said voltage impressing means.

12. A network for gating a signal across a pair of signal transmission terminals comprising, in combination:
   a first diode;
   a second diode in parallel and oppositely poled in respect to said first diode, said diodes in parallel across said terminals; and
   means connected to said diodes for biasing said diodes alternately into conduction and nonconduction, said biasing means including a bistable current source in connection with said diodes and a capacitor in shunt between the connection and one of said network terminals such that abrupt changes in current from said bistable current source to gate said signal alternately on and off produce gradually varying changes in the biasing voltages for said diodes.

13. The network as set forth in claim 10 including a second resistor and a third diode in series connection, said series connected diode and resistor in parallel connection across said voltage control resistor such that said biasing means may provide unequal and controlable rise and decay periods between on and off modes of said signal gating network without requiring unequal values for said first and said second DC voltages.

* * * * *